United States Patent [19]

Veach

[11] 4,442,819

[45] Apr. 17, 1984

[54] HEATER FOR A DIESEL FUEL FILTER

[75] Inventor: B. R. Veach, Maple Plain, Minn.

[73] Assignee: Nationwide Carriers Incorporated, Maple Plain, Minn.

[21] Appl. No.: 374,498

[22] Filed: May 3, 1982

[51] Int. Cl.³ .............................................. F02M 31/00
[52] U.S. Cl. .................................... 123/557; 210/186; 210/184; 123/196 AB
[58] Field of Search ........................... 123/557, 196 R; 210/186, 183, 184, 185

[56] References Cited

U.S. PATENT DOCUMENTS

| 1,623,074 | 4/1927  | Tartrais . |         |
|-----------|---------|------------|---------|
| 2,331,482 | 10/1943 | Lamb       | 210/186 |
| 2,331,856 | 10/1943 | Pearson    | 210/186 |
| 2,348,247 | 5/1944  | Dushane    | 210/186 |
| 2,533,881 | 12/1950 | Duff .     |         |
| 3,110,296 | 11/1963 | Lundi .    |         |
| 3,278,032 | 10/1966 | Smith      | 210/186 |
| 3,935,901 | 2/1976  | Virgil .   |         |
| 4,003,356 | 1/1977  | Naylor .   |         |
| 4,091,265 | 5/1978  | Richards   | 210/184 |
| 4,091,782 | 5/1978  | Dunnam .   |         |
| 4,208,996 | 6/1980  | Lancaster .|         |
| 4,218,999 | 8/1980  | Shearer .  |         |
| 4,338,189 | 7/1982  | Johnson    | 210/184 |
| 4,338,907 | 7/1982  | Lindbeck   | 123/557 |
| 4,368,716 | 1/1983  | Davis      | 123/557 |

FOREIGN PATENT DOCUMENTS

| 451491 | 9/1948 | Canada  | 210/186 |
| 488598 | 3/1976 | U.S.S.R.| 210/186 |

Primary Examiner—Ronald H. Lazarus
Attorney, Agent, or Firm—Merchant, Gould, Smith, Edell, Welter & Schmidt

[57] ABSTRACT

A heater (16) for heating diesel fuel in a fuel filter (15) to prevent jelling of the diesel fuel is disclosed. The heater (16) includes a receptacle (34) having an open top and an internal cavity (35). The fuel filter (15) is positioned in the internal cavity (35). A first O-ring (36) secured to the receptacle (34) sealingly engages the fuel filter (15) to close the open top. Conduit means connect the internal cavity (35) to a coolant system (31). The conduit means includes an inlet conduit (32) having a first end (32a) which may be connected to for fluid communication with the coolant system (31) and a second end (32b) secured to the receptacle (34) and in fluid communication with the internal cavity (35). The outlet conduit (33) has a first end (33a) which may be connected in fluid communication with the liquid coolant system (31) and a second end (33b) cooperatively connected to the receptacle (34) and in fluid communication with the internal cavity (35). The heated liquid in the coolant system (31) passes through the inlet conduit into the internal cavity (35), adjacent the fuel filter (15) heating the diesel fuel in the fuel filter (15). The heated liquid exits the receptacle (34) through the outlet conduit (33). Means for fastening the receptacle (34) to the fuel filter (15) is also provided.

14 Claims, 7 Drawing Figures

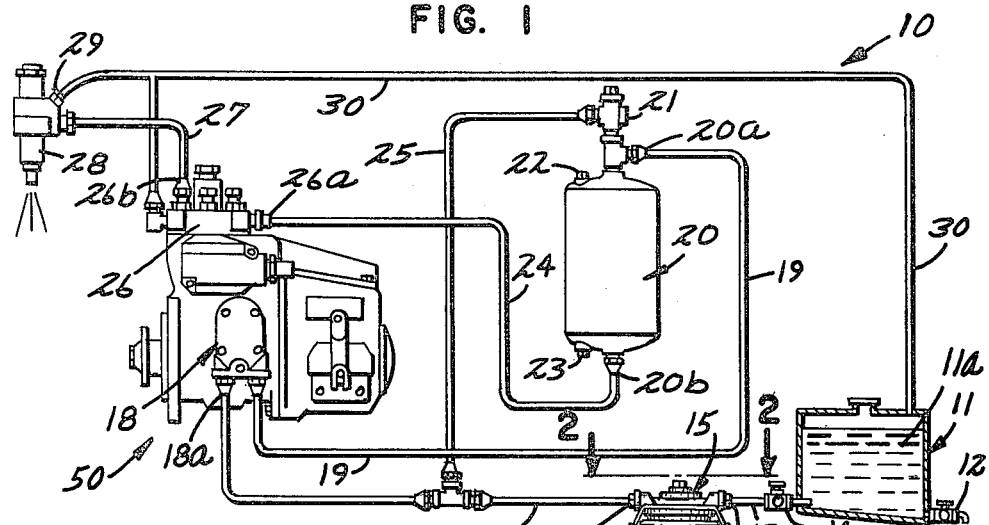
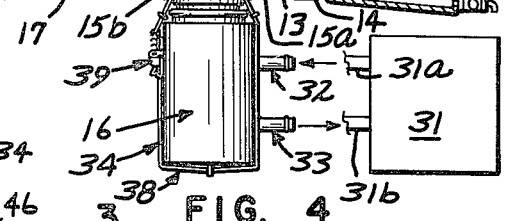
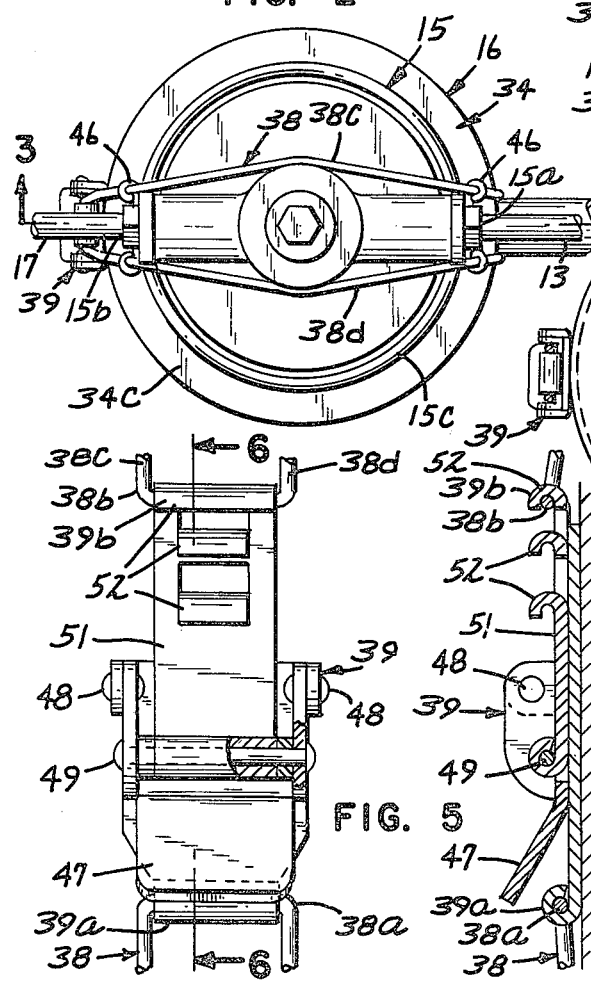
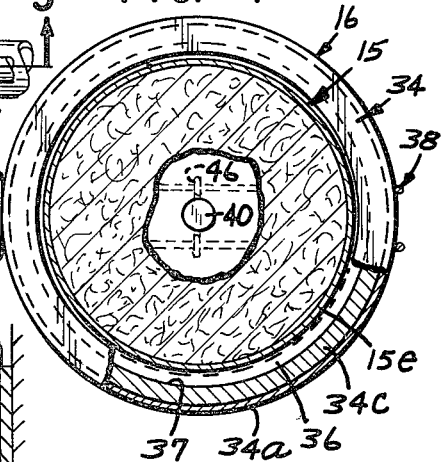

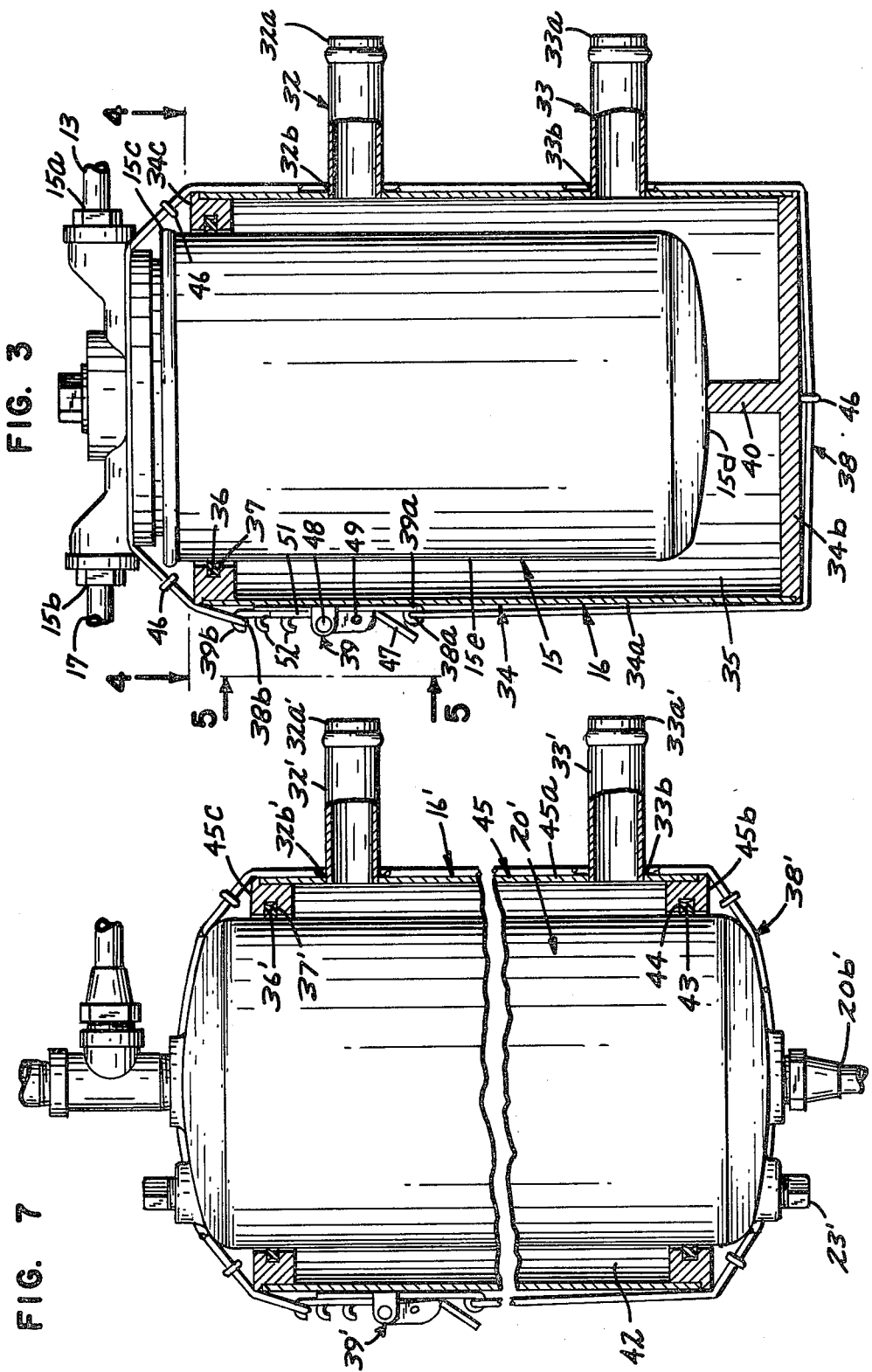

HEATER FOR A DIESEL FUEL FILTER

BACKGROUND OF THE INVENTION

1. Field of the Invention

This invention relates generally to devices for heating fuel oil prior to passage into a diesel engine. More particularly, this invention relates to a heater for heating diesel fuel within a fuel filter.

2. Description of the Prior Art

Diesel fuel, more particularly, No. 2 fuel oil has a tendency to jell or "wax" in cold weather. This jelling of diesel fuel is a particularly acute problem in the trucking industry in the winter months in the northern portion of the United States and throughout Canada. During the winter months, temperatures and windchill factors frequently reach minus 30 degrees fahrenheit or lower in these areas. In such a temperature and windchill range, diesel fuel tends to jell or wax both in the fuel tank itself and within the fuel line leading from the tank to the engine. In the severest incidence of jelling, the diesel engine completely fails. The truck must be towed to a service area. The towing and downtime of the truck results in increased transportation costs. In less severe instances, the jelling can result in loss of power so that the trucks are forced to travel at a slow rate of speed. This also results in increased transportation cost.

Numerous methods and apparatus have been used in the past in an attempt to solve this problem. Heating mechanisms have been interposed in the fuel supply line and in the fuel tank itself. In addition, devices have been used to heat a fuel filter and thereby the fuel oil in the fuel filter.

U.S. Pat. No. 3,935,901 issued Feb. 3, 1976, to Eldon E. Virgil is an example of a fuel filter heater. An arcuate chamber is fitted against a portion of a replaceable fuel line filter in a diesel engine. The chamber has inlet and outlet lines for passing engine exhaust gases through the chamber, thereby heating the fuel filter. The chamber does not surround the fuel filter, thus it directly heats only a portion of the fuel filter. In addition, the exhaust gases are separated from the fuel filter by an inner wall. The exhaust gases are not in direct contact with the fuel filter and the heat of the exhaust gases must pass through the inner wall before reaching the fuel filter.

In addition to heating the fuel filter to prevent jelling of the diesel fuel, it is also known to heat the fuel filter to remove gases contained in the fuel. U.S. Pat. No. 1,623,074 issued to E.H. Tartrais on Apr. 5, 1927 illustrates such a heater. A water jacket, having an inlet pipe and outlet pipe which allows circulation of the engine waters through the jacket, surrounds the fuel filter. However, the water jacket is spaced from the fuel filter and the water does not contact the filter. Therefore, the heat transfer is not optimal.

An example of a heated gas line vapor filter and internal combustion engine is shown in U.S. Pat. No. 4,003,356 issued Jan. 18, 1977 to Harry E. Naylor. A heating jacket having liquid lines to and from the radiator conveys fluid adjacent the fuel filter. However, the fuel filter is enclosed in the heating jacket and is not easily removable.

SUMMARY OF THE INVENTION

The present invention provides an improved heater for heating diesel fuel in a fuel filter. The heater is used in combination with a fuel system in a diesel engine, having a liquid coolant system, to prevent jelling of the diesel fuel. The heater includes a receptacle having an open top and an internal cavity. The bottom end of the fuel filter is positioned in the cavity and the top end of the fuel filter extends above the receptacle. A portion of the fuel filter sidewall is in spaced relationship to the receptacle. Means for sealing the open top is provided. The sealing means and the fuel filter in combination close the open top. Conduit means connect the internal cavity to the coolant system. The conduit means includes an inlet conduit and an outlet conduit. The inlet conduit has a first end cooperatively connected to and in fluid communication with the liquid coolant system. A second end is cooperatively connected to the receptacle and is in fluid communication with the internal cavity. The outlet conduit has a first end cooperatively connected to and in fluid communication with the liquid coolant system. A second end is cooperatively connected to the receptacle and in fluid communication with the internal cavity. The heated liquid in the coolant system is passed through the internal cavity and adjacent to the fuel filter, thereby heating the diesel fuel in the fuel filter.

In a preferred embodiment, a fastening means is provided. The fastening means includes a bail member having first and second ends. The bail member extends around the receptacle and across the top of the fuel filter. A first end of a latch mechanism is cooperatively connected to the first end of the bail member. The second end of the latch member is releasably connected to the second end of the bail member.

In another embodiment of the invention, the receptacle has an open bottom. Means for sealing the open bottom is provided.

BRIEF DESCRIPTION OF THE DRAWING

FIG. 1 is a side elevational view of a system for heating diesel fuel incorporating the present invention.

FIG. 2 is an enlarged top plan view of the heater shown in FIG. 1, taken generally along the line 2—2.

FIG. 3 is a cross-sectional view of the heater shown in FIG. 2, taken generally along the line 3—3.

FIG. 4 is a cross-sectional view of the heater shown in FIG. 3, taken generally along the line 4—4.

FIG. 5 is a side elevational view of a portion of the heater shown in FIG. 3, taken generally along the line 5—5.

FIG. 6 is a cross-sectional view of the portion of the heater shown in FIG. 5, taken generally along the line 6—6.

FIG. 7 is a cross-sectional view of an alternative embodiment of the present invention.

DETAILED DESCRIPTION OF THE INVENTION

Referring to the drawings, wherein like numerals represent like parts throughout the several views, there is shown in FIG. 1 a fuel system designated generally as 10. The fuel system 10 for a diesel engine 50, includes a fuel tank 11 which is designed to hold diesel fuel 11a. The fuel tank 11 has a drain 12 which can be used to empty the diesel fuel 11a from the fuel tank 11. A supply line 13 has a first end connected to and in fluid communication with the fuel tank 11. A second end of the supply line 13 is connected to and in fluid communication with an inlet 15a of a fuel filter 15. A shut-off valve 14 is connected to the supply line 13 to shut off the flow of fuel 11a to the fuel filter 15 if required. The fuel 11a enters the inlet 15a, circulates through the fuel filter 15 and exits the outlet 15b of the fuel filter 15 through a supply line 17 to an inlet 18a of the fuel pump 18. As will more fully be described hereinafter, a heater 16 is secured to the fuel filter 15. The fuel 11a is pumped by the fuel supply pump 18 through outlet 18b and passes through supply line 19 to an inlet 20a of a final stage fuel filter 20. The final stage fuel filter 20 has a bleed 22 and drain 23. The diesel fuel 11a circulates through the final stage fuel filter 20 and exits through outlet 20b of the final stage fuel filter 20 to a supply line 24 and then to an inlet 26a of a fuel injection pump 26. The diesel fuel 11a is pumped by the fuel injection pump 26 through outlet 26b of the fuel pump 26 and passes through supply line 27 to a spray nozzle holder 28. An overflow valve 21 is connected to and in fluid communication with the final stage fuel filter 20. Any overflow of the fuel 11a from the final stage fuel filter 20 passes through the overflow valve 21, through overflow line 25 and to the supply line 17. The spray nozzle and holder 28 is connected to a return line 30 by leak-off 29. The return line 30 is connected at its other end to the fuel tank 11. It is understood that the fuel system 10 is illustrative of one example of a fuel system and that the heater 16 may be used in combination with any suitable fuel system.

As shown in FIGS. 2-4, a heater, designated generally as 16, includes a receptacle 34 having an open top. The receptacle 34 defines an internal cavity 35. A second end 32b of inlet conduit 32 is cooperatively connected in a fluid tight manner to the receptacle 34 and is in fluid communication with the internal cavity 35. A first end 32a of inlet conduit 32 is adapted to be connected to an inlet 31a of the coolant system 31 by appropriate conventional connecting means. The inlet 31a of coolant system 31 an inlet conduit 32 place the coolant system 31 in fluid communication with the internal cavity 35 of heater 16. A second end 33b of outlet conduit 33 is cooperatively connected in a fluid tight manner to the receptacle 34 and is in fluid communication with the internal cavity 35. A first end 33a of outlet conduit 33 is adapted to be connected to outlet 31b of coolant system 31 by appropriate conventional connecting means. The outlet 31b of coolant system 31 and outlet conduit 32 also place the coolant system 31 in fluid communication with the internal cavity 35 of heater 16.

The receptacle 34 has a sidewall 34a cooperatively connected in a fluid tight manner to a bottom end 34b. Cooperatively connected in a fluid tight manner to the sidewall 34a is a top section 34c. An opening in the top section 34c defines the open top of receptacle 34. The top section 34c has an annular groove 37. an O-ring 36 is secured in the annular groove 37. A stand-off 40 is secured to the bottom end 34b of receptacle 34. In a preferred embodiment, the cross-section of the internal cavity 35 is cylindrical to match the cylindrical shape of most fuel filters. It is understood the open top in the receptacle 34 may be any suitable shape to correspond to the outside wall of various sized filters. It is further to be understood that the diameter and length of the receptacle 34 will vary to accommodate various sizes of filters 15.

The fuel filter 15 is positioned in the internal cavity 35. In a preferred embodiment, the bottom end 15d of the fuel filter 15 rests on and is supported by the stand-off 40. A top end 15c of the fuel filter 15 extends above the receptacle 34 and at least a portion of a sidewall 15e of the fuel filter 15 is in spaced relationship to the side 34a of the receptacle 34. The O-ring 36 and a portion of the sidewall 15e of fuel filter 15 contact each other to seal the open top of the receptacle 34 in a fluid tight manner. Liquid in the coolant system 31 is pumped (by an appropriate means not shown) through conduit 32 and into the internal cavity 35. The liquid passes adjacent the sidewall 15e and bottom end 15d of fuel filter 15, thereby heating diesel fuel 11a in the fuel filter 15. The liquid then returns via outlet conduit 33 to the coolant system 31. In a preferred embodiment, substantially all of the sidewall 15e of fuel filter 15 is in spaced relationship to the receptacle 34, thereby allowing the liquid from the coolant system 31 to contact substantially all of the sidewall 15e, thereby providing better heat transfer between the liquid and the fuel filter 15.

A bail member 38 extends around the outside of sidewall 34a and bottom 34b of receptacle 34 and across the top end 15c of the fuel filter 15. A first end 38a of the bail member 38 is cooperatively connected to a first end 39a of a latch mechanism 39. A second end 38b of bail member 38 is releasably connected to a second end 39b of the latch mechanism 39. The second end 39b of the latch mechanism 39 includes a plurality of hook members 52.

In a preferred embodiment, the bail member 38 is one continuous member having a first portion 38c and second portion 38d. The continuous member 38 is in the general shape of a loop, wherein the first and second portions 38c and 38d meet at one end of the loop at first end 38a and at the other end of the loop at second end 38b. Separating bars 46 are secured to the first and second portions 38c and 38d to keep the portions 38c and 38d in a spaced relationship.

As can be seen in FIGS. 5 and 6, the latch mechanism 39 includes a movable arm 47 that rotates about upper pivot 48. Arm member 51 rotates about lower pivot 49. The arm member 51 has the second end 39b of the latch mechanism formed at one end. A plurality of hooks 52 are secured to the movable arm 51 at successive positions closer to the lower pivot 49. The second end 38b of the bail member 38 is releasably secured to either the second end 39b or one of the hooks 52. To release the second end 38b of the bail member 38, the movable arm 47 is pivoted about upper pivot 48 away from the sidewall 34a of receptacle 34. This movement carries with it the arm member 51. This moves the arm member 51 in an upward direction, thereby loosening the second end 38b of the bail member 38 from the second end 39b of latch mechanism 39. The arm member 51 is free to rotate about the lower pivot 49, thereby assisting in the removal of the second end 39b of latch mechanism 39. It will be appreciated by those skilled in the art that any other suitable latch mechanism or bail member may be used to secure the heater 16 to the fuel filter 15, other than the particular embodiment shown in FIGS. 5 and 6.

Another embodiment of the fuel filter heater is shown in FIG. 7 and is generally designated as 16'. Elements of the device 16' which are similar to elements of the device 16 will be indicated by like primed numerals. The heater 16' is illustrated in use with a fuel filter 20' having a drain 23' and outlet 20b'. The heater 16' includes a receptacle 45 having a sidewall 45a connected in a fluid-tight manner to bottom section 45b. A top section 45c is cooperatively connected in a fluid-tight manner to sidewall 45a. Top section 45c has an annular groove 37' and an O-ring 36' secured to the annular groove 37. The bottom section 45b has an annular groove 44 and an O-ring 43 secured thereto. Bail member 38' and latch mechanism 39' secure the fuel filter 20' to the heater 16'. The receptacle 45 defines an internal cavity 42 having an open top and open bottom.

An inlet conduit 32' having a second end 32b' is cooperatively connected in a fluid-tight manner to the receptacle 45 and in fluid communication with the internal cavity 42. A first end 32a' is adapted for being cooperatively connected and in fluid communication with the liquid coolant in system 31. An outlet conduit 33' has a second end 33b' cooperatively connected in a fluid-tight manner to the receptacle 45 and in fluid communication with the internal cavity 42. A first end 33a' is adapted for being cooperatively connected to and in fluid communication with the liquid coolant system 31. The open bottom of the heater 16' allows for the outlet 20b' and drain 23' to be easily accessible without having to remove the heater 16'. The fuel filter 20' is positioned in the receptacle 45. The top portion of the fuel filter 20' extends above the top end 45c and the bottom end of the fuel filter 20' extends below the bottom end 45b of receptacle 45. The O-ring 36' and sidewall 20c' seal the open top of the receptacle 45. The O-ring 43 and fuel filter sidewall 20c' engage each other to seal the bottom end of the receptacle 45. Similar to the operation of heater 16, in heater 16' liquid from the coolant system 31 enters the internal cavity 42 through inlet conduit 32' and passes around and adjacent the sidewall 20c' of fuel filter 20', thereby heating diesel fuel 11a in the fuel filter 20'. The liquid returns to the coolant system 31 through outlet conduit 33'.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follow in the spirit and broad scope of the appended claims are included.

What is claimed is:

1. In combination with a fuel system in a diesel engine having a liquid coolant system, a heater for heating diesel fuel in a fuel filter, the filter having a sidewall, a top end and a bottom end, said heater comprising:
    (a) a receptacle having an open top, said receptacle defining an internal cavity, the bottom end of the fuel filter positioned in said cavity and the top of the fuel filter extending above said receptacle, a portion of the sidewalls of the fuel filter in a spaced relationship to said receptacle;
    (b) first means for sealing said receptacle open top, said first means constructed and arranged to cooperatively engage the fuel filter sidewall and closing said receptacle open top;
    (c) conduit means for connecting said internal cavity to the coolant system, said conduit means including an inlet conduit and an outlet conduit, said inlet conduit having a first end constructed to be cooperatively connected to and in fluid communication with the liquid coolant system, and a second end cooperatively connected to said receptacle and in fluid communication with said internal cavity, said outlet conduit having a first end constructed to be cooperatively connected to and in fluid communication with the liquid coolant system, and a second end cooperatively connected to said receptacle and in fluid communication with said internal cavity, whereby heated liquid in the coolant system is passed through said inlet conduit into said internal cavity and adjacent the fuel filter to heat diesel fuel in the fuel filter, said heated liquid exiting said internal cavity through said outlet conduit; and
    (d) means, for fastening said receptacle to the fuel filter, said fastening means including a bail member having first and second ends, said bail member extending around said receptacle and across the top end of the fuel filter, and a latch mechanism having a first end cooperatively connected to said first end of said bail member and a second end releasably connected to said second end of said bail member.

2. The heater of claim 1, wherein said receptacle is a cylinder.

3. The heater of claim 1, wherein said receptacle has an open bottom.

4. The heater of claim 3, further comprising second means for sealing said open bottom, said second sealing means constructed and arranged to engage the fuel filter in a manner which closes said open bottom.

5. The heater of claim 1, wherein said first sealing means includes an annular groove in said receptacle proximate said open top and an O-ring positioned in said groove, said O-ring sealing by engaging the sidewall of the fuel filter.

6. The heater of claim 4, wherein said second sealing means includes a second annular groove in said receptacle proximate said open bottom and an O-ring positioned in said groove, said O-ring sealingly engaging a portion of the fuel filter sidewall.

7. In combination with a fuel system in a diesel engine having a liquid coolant system, a heater for heating diesel fuel in a fuel filter to prevent jelling of the diesel fuel, the filter having a sidewall, a top end and a bottom end, said heater comprising:
    (a) a cylindrical receptacle having an open top, said cylindrical receptacle defining an internal cavity, the bottom end of the fuel filter positioned in said cavity and the top end of the fuel filter extending above said receptacle, with substantially all of the sidewall of the fuel filter being in spaced relationship to said cylindrical receptacle;
    (b) a first O-ring proximate to said open top and means for securing said O-ring to said receptacle, said O-ring engaging a portion of the fuel filter sidewall and sealing said open top;
    (c) conduit means for connecting said internal cavity to the coolant system, said conduit means including an inlet conduit and an outlet conduit, said inlet conduit having a first end constructed to be cooperatively connected to and in fluid communication with the liquid coolant system, and a second end cooperatively connected to said receptacle and in fluid communication with said internal cavity, said outlet conduit having a first end constructed to be cooperatively connected to and in fluid communication with the liquid coolant system, and a second end cooperatively connected to said receptacle and in fluid communication with said receptacle and in fluid communication with said internal cavity, said conduits allowing the heated liquid in the coolant system to pass into said internal cavity, adjacent to and in contact with the fuel filter heating the diesel fuel within the fuel filter; and (d) means, for fastening said receptacle to the fuel filter, said fastening means including a bail member having first and second ends, said bail member extending around said receptacle and across the top end of the fuel filter, and a latch mechanism having a first end cooperatively connected to aid first end of said bail member and a second end releasably connected to said second end of said bail member.

8. The heater of claim 7, wherein said receptacle has an open bottom and further includes a second O-ring positioned proximate said open bottom, said O-ring sealingly engaging said fuel filter sidewall, thereby closing said receptacle open bottom.

9. A system for heating diesel fuel, in a diesel engine vehicle to prevent jelling of diesel fuel, said system comprising:
  (a) a fuel tank for storing diesel fuel;
  (b) a diesel engine;
  (c) a fuel filter having an inlet and an outlet, said fuel filter having a sidewall, a top end and a bottom end;
  (d) a liquid coolant system;
  (e) a first supply line having a first end in fluid communication with said fuel tank and a second end in fluid communication with said fuel filter inlet;
  (f) a second supply line having a first end in fluid communication with said outlet of said fuel filter and a second end in fluid communication with said diesel engine; and
  (g) a fuel filter heater comprising:
    (i) a receptacle having an open top and an internal cavity, said bottom end of said fuel filter positioned in said cavity with said top end of said fuel filter extending above said receptacle, a portion of said sidewalls of said fuel filter being in spaced relationship with said receptacle;
    (ii) first means for closing said open top, said first means sealingly engaging a portion of said fuel filter sidewall thereby closing said open top;
    (iii) conduit means for connecting said internal cavity to said coolant system, said conduit means including an inlet conduit and an outlet conduit, said inlet conduit having a first end cooperatively connected to and in fluid communication with said liquid coolant system, and a second end cooperatively connected to said receptacle and in fluid communication with said internal cavity, said outlet conduit having a first end cooperatively connected to and in fluid communication with said liquid cooling system, and a second end cooperatively connected to said receptacle and in fluid communication with said internal cavity, whereby heated liquid in said coolant system passes through said inlet conduit into said internal cavity, adjacent said fuel filter, heating the diesel fuel in said fuel filter, and exiting through said outlet conduit; and
    (iv) means, for fastening said receptacle to said fuel filter, said fastening means including a bail member having first and second ends, said bail member extending around said receptacle and across the top end of the fuel filter, and a latch mechanism having a first end cooperatively connected to said first end of said bail member and a second end releasably connected to said second end of said bail member.

10. The system of claim 9, wherein said receptacle is a cylinder.

11. The system of claim 9, wherein said receptacle has an open bottom.

12. The system of claim 11, further comprising second means for sealing said receptacle open bottom, said second sealing means constructed and arranged to sealingly engage a portion of said fuel filter sidewall thereby closing said receptacle open bottom.

13. The system of claim 9, wherein said first sealing means includes an O-ring positioned proximate to said open top and secured to said receptacle.

14. The system of claim 12, wherein said second sealing means includes an O-ring positioned proximate to said open bottom and secured to said receptacle.

* * * * *